United States Patent
Koyama et al.

(10) Patent No.: US 12,411,489 B2
(45) Date of Patent: Sep. 9, 2025

(54) VEHICLE CONTROL METHOD, CONTROL DEVICE, AND VEHICLE CONTROL SYSTEM

(71) Applicant: DENSO TEN Limited, Kobe (JP)

(72) Inventors: Kazuya Koyama, Kobe (JP); Tomoya Takagi, Kobe (JP); Haruo Harada, Kobe (JP); Yasuomi Kimura, Kobe (JP); Miki Hitotsuya, Kobe (JP)

(73) Assignee: DENSO TEN Limited, Kobe (JP)

( * ) Notice: Subject to any disclaimer, the term of this patent is extended or adjusted under 35 U.S.C. 154(b) by 218 days.

(21) Appl. No.: 18/184,040

(22) Filed: Mar. 15, 2023

(65) Prior Publication Data

US 2023/0213934 A1    Jul. 6, 2023

Related U.S. Application Data

(63) Continuation of application No. PCT/JP2021/010400, filed on Mar. 15, 2021.

(51) Int. Cl.
G05D 1/00         (2024.01)
A61G 5/10         (2006.01)

(52) U.S. Cl.
CPC ......... *G05D 1/0022* (2013.01); *A61G 5/1051* (2016.11); *G05D 1/0061* (2013.01); *G05D 1/0088* (2013.01)

(58) Field of Classification Search
CPC .. G05D 1/0022; G05D 1/0061; G05D 1/0088; G05D 1/0297; A61G 5/1051; A61G 2203/22; B60W 60/00; G08G 1/16
USPC ........................................................... 701/2
See application file for complete search history.

(56) References Cited

U.S. PATENT DOCUMENTS

| | | | | |
|---|---|---|---|---|
| 9,368,026 | B1* | 6/2016 | Herbach | G06F 9/46 |
| 10,769,902 | B1* | 9/2020 | Kronz | G08B 7/062 |
| 2009/0012666 | A1* | 1/2009 | Simpson | A61G 5/04 |
| | | | | 701/23 |
| 2009/0079575 | A1* | 3/2009 | Bouressa | G07C 9/27 |
| | | | | 340/573.4 |
| 2009/0281850 | A1* | 11/2009 | Bruce | H04W 4/90 |
| | | | | 701/532 |
| 2015/0174755 | A1* | 6/2015 | Rhodes | B25G 3/20 |
| | | | | 16/110.1 |
| 2017/0266069 | A1* | 9/2017 | Lozano | A61G 5/04 |
| 2017/0320705 | A1* | 11/2017 | Honda | B66B 1/28 |
| 2018/0224853 | A1* | 8/2018 | Izhikevich | G05D 1/0088 |
| 2019/0012887 | A1* | 1/2019 | Troesch | G08B 27/006 |

(Continued)

FOREIGN PATENT DOCUMENTS

| | | |
|---|---|---|
| JP | 2017-131501 A | 8/2017 |
| JP | 2018-010579 A | 1/2018 |
| JP | 2020-144129 A | 9/2020 |

*Primary Examiner* — Tuan C To
*Assistant Examiner* — Dominick Mulder
(74) *Attorney, Agent, or Firm* — Oliff PLC

(57) ABSTRACT

A vehicle control method to be executed by a controller for controlling a vehicle that travels in an area including a plurality of floors, wherein the controller is configured to: in a case where detecting occurrence of a disaster and determining that a floor on which the vehicle exists is different from a floor on which a first evacuation place being a priority evacuation place exists, set a destination to a second evacuation place existing on a floor that is a same as the floor on which the vehicle exists; and cause the vehicle to move to the second evacuation place.

12 Claims, 11 Drawing Sheets

(56) References Cited

U.S. PATENT DOCUMENTS

| | | | | |
|---|---|---|---|---|
| 2019/0129420 A1* | 5/2019 | Yoshizaki | ............. | B60W 30/10 |
| 2019/0213888 A1* | 7/2019 | Koishi | ................. | G08G 1/166 |
| 2019/0278278 A1* | 9/2019 | Yasuda | ................ | G05D 1/0214 |
| 2020/0113755 A1* | 4/2020 | Seko | .................... | G05D 1/0231 |
| 2020/0150658 A1* | 5/2020 | Ueda | .................... | B60Q 1/1423 |
| 2020/0364819 A1* | 11/2020 | de Hoog | ............. | G06Q 90/205 |
| 2021/0086757 A1* | 3/2021 | Sugano | ................ | B60W 30/06 |
| 2021/0312356 A1* | 10/2021 | Higashide | ............ | G05D 1/0217 |
| 2022/0005142 A1* | 1/2022 | Mrozek | ............... | G06Q 90/205 |

\* cited by examiner

VEHICLE CONTROL METHOD, CONTROL DEVICE, AND VEHICLE CONTROL SYSTEM

CROSS-REFERENCE TO RELATED APPLICATION

This application is a continuation of International Application No. PCT/JP2021/010400, filed on Mar. 15, 2021, the entire contents of which are incorporated herein by reference.

FIELD

The embodiment discussed herein is directed to a vehicle control method, a control device, and a vehicle control system.

BACKGROUND

Conventionally, there are known an ultra-compact mobility device and a personal mobility device (hereinafter, simply referred to as a "mobility device"), which are vehicles that assist movement of a user in a predetermined area such as a large-scale commercial facility or a medical nursing home.

To reduce a burden on the user who causes such a mobility device to move, there is also developed a vehicle control system that generates a route to a destination when the user inputs the destination to the mobility device, and causes the mobility device to automatically move to the destination along the route (for example, refer to Japanese Laid-open Patent Publication No. 2018-010579).

However, in the related art, examination about vehicle control for mobility devices at the time when a disaster such as a fire or an earthquake occurs has not made progress, so that such examination is required to be sufficiently carried out in view of safety.

SUMMARY

A vehicle control method according an aspect of an embodiment is a vehicle control method to be executed by a controller for controlling a vehicle that travels in an area including a plurality of floors, wherein the controller is configured to: in a case where detecting occurrence of a disaster and determining that a floor on which the vehicle exists is different from a floor on which a first evacuation place being a priority evacuation place exists, set a destination to a second evacuation place existing on a floor that is a same as the floor on which the vehicle exists; and cause the vehicle to move to the second evacuation place.

DESCRIPTION OF EMBODIMENTS

The following describes an embodiment of a vehicle control method, a control device, and a vehicle control system disclosed herein in detail with reference to the attached drawings. The present invention is not limited to the embodiment described below.

In the following description, a vehicle V according to the embodiment is assumed to be an ultra-compact mobility device or a personal mobility device as a vehicle that assists movement of a user in a predetermined area such as a large-scale commercial facility, a medical nursing home, or an airport facility.

Each of facilities described above may be a facility constituted of one building such as a large-scale department store, or a facility in which a plurality of buildings are disposed within a site such as a shopping mall. The building may be a multi-storied building, or a one-storied building without other stories.

The vehicle V may be a vehicle that is lent out to a user who uses a facility by an operation side of the facility, or a privately owned vehicle that is usually used by the user outside the facility. In a case of the privately owned vehicle V, an application that enables information processing on the vehicle V side described below may be downloaded and installed in advance before visiting the facility or at the time of visiting the facility.

In the following description, exemplified is a case in which the vehicle control device according to the embodiment is an onboard device 10 mounted on the vehicle V.

Figure 1:
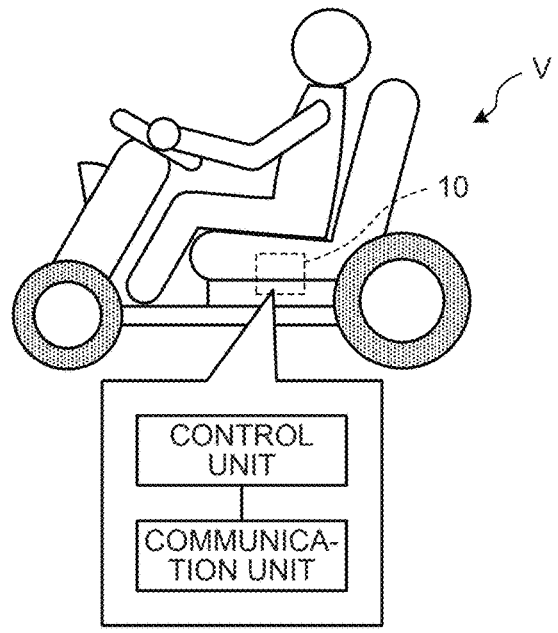
FIG. 1 is a diagram illustrating a schematic configuration of a vehicle according to an embodiment.
Figure 2:
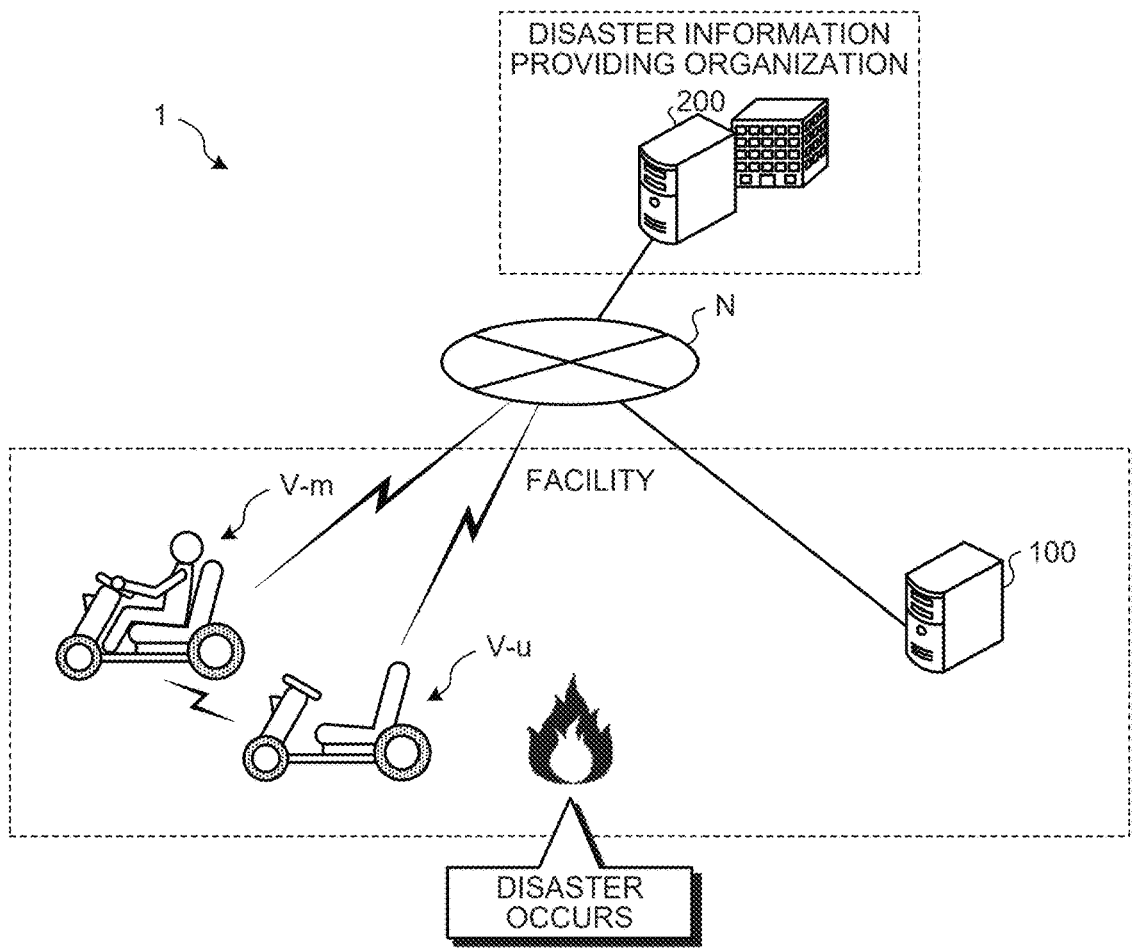
FIG. 2 is a diagram illustrating a configuration example of a vehicle control system according to the embodiment.
Figure 3:
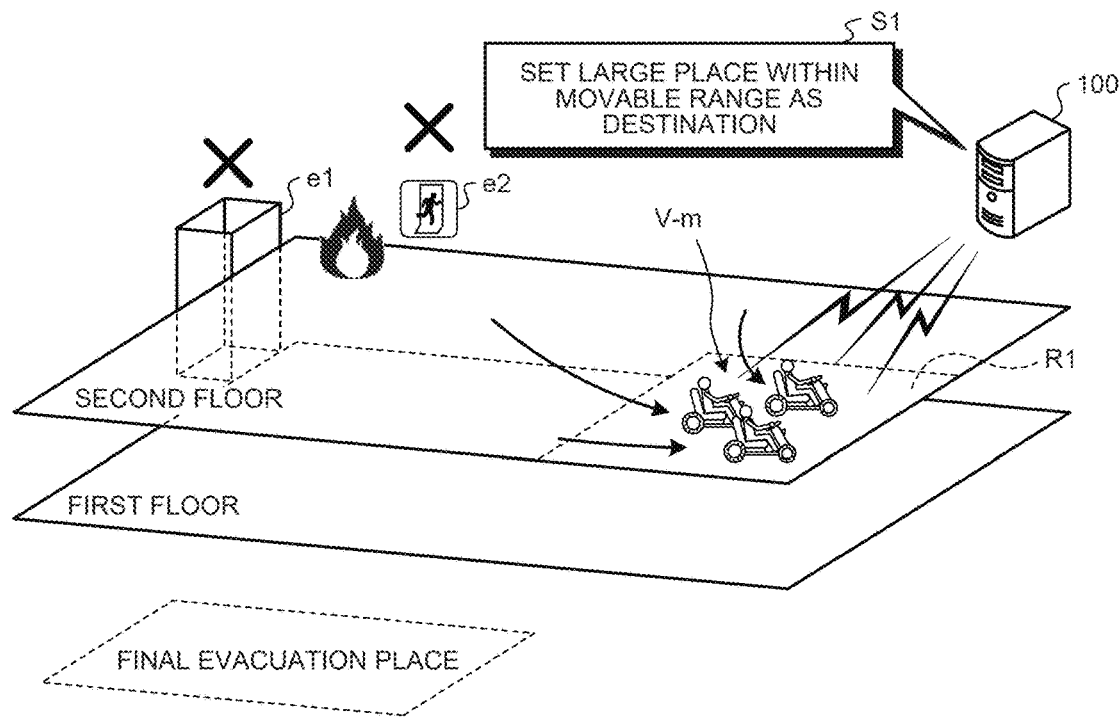
FIG. 3 is an outline explanatory diagram (part 1) of a vehicle control method according to the embodiment.
Figure 4:
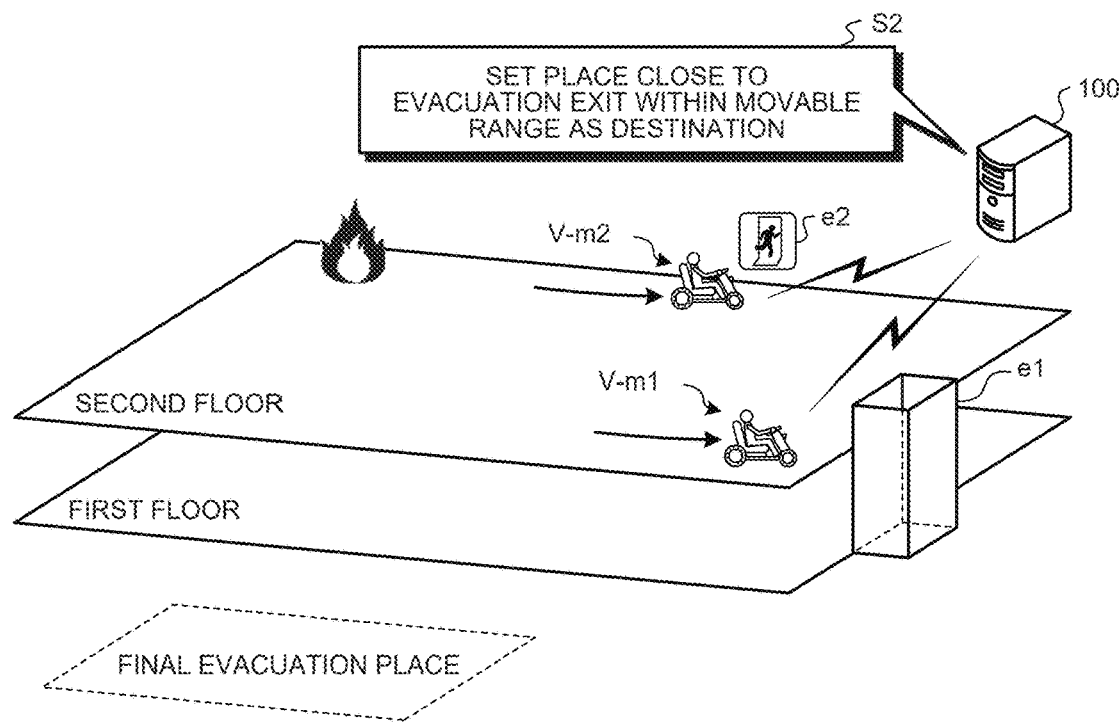
FIG. 4 is an outline explanatory diagram (part 2) of the vehicle control method according to the embodiment.
Figure 5:
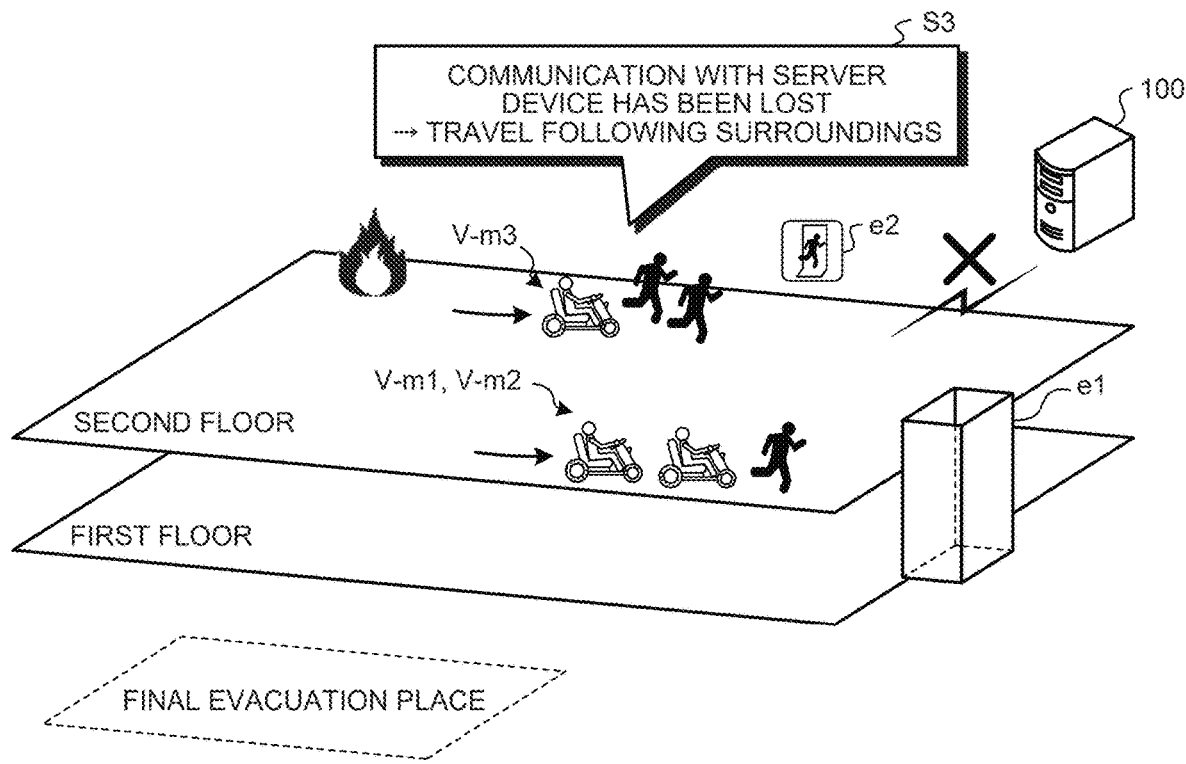
FIG. 5 is an outline explanatory diagram (part 3) of the vehicle control method according to the embodiment.

FIG. 1 is a diagram illustrating a schematic configuration of the vehicle V according to the embodiment. FIG. 2 is a diagram illustrating a configuration example of the vehicle control system according to the embodiment. FIG. 3 to FIG. 5 are outline explanatory diagrams (part 1) to (part 3) of the vehicle control method according to the embodiment.

As illustrated in FIG. 1, the vehicle V according to the embodiment is substantially a single-seated or double-seated electric vehicle known as an ultra-compact mobility device or a personal mobility device. Herein, the vehicle V is described as an electric vehicle using a motor as a power source, but the vehicle V may also be a vehicle using another power source such as an internal combustion engine as a power source. There are various types of vehicles V such as a wheelchair type and a standing-ride type in addition to a cart type illustrated in FIG. 1.

As illustrated in FIG. 1, the vehicle V includes the onboard device 10. The onboard device 10 includes a control unit and a communication unit. The control unit controls the vehicle V by manual driving control by a driving operation performed by a user, an instruction from an external device acquired via the communication unit, and automatic driving control based on an external situation and the like acquired via an onboard sensor unit (not illustrated).

The onboard device 10 can cause the vehicle V to perform automatic traveling by automatic driving control in any of a manned state in which a user is riding on the vehicle as illustrated in FIG. 1 and an unmanned state in which the user is not riding on the vehicle. In the following description, the vehicle V in the manned state may be referred to as a "manned vehicle V-m", and the vehicle V in the unmanned state may be referred to as an "unmanned vehicle V-u".

In recent years, the vehicle V as described above starts to be introduced as moving means for a user in a facility such as a large-scale commercial facility or a medical nursing home. However, examination about vehicle control for the vehicle V at the time when a disaster such as a fire and an earthquake occurs has not made progress. Thus, also in view of safety, it is preferable to enrich the vehicle control method for the vehicle V at the time when a disaster occurs.

Accordingly, in the vehicle control method according to the embodiment, if the vehicle V on which a person is riding is difficult to move from a current position to a predetermined evacuation place in a case in which a disaster requiring evacuation occurs, the vehicle V is moved to a place appropriate for evacuation within a movable range.

Specifically, the following describes a vehicle control system 1 to which the vehicle control method according to the embodiment is applied. As illustrated in FIG. 2, the vehicle control system 1 according to the embodiment includes vehicles V including the manned vehicle V-m and the unmanned vehicle V-u, a server device 100, and a disaster information providing device 200. Each of the number of manned vehicles V-m and the number of unmanned vehicles V-u may be one or multiple in a facility. The manned vehicle V-m and the unmanned vehicle V-u are the vehicles V basically having the same configuration, and are different from each other only in whether a person is riding thereon. The unmanned vehicle V-u may be configured by the vehicle V having a configuration different from that of the manned vehicle V-m, for example, the vehicle V dedicated to carrying baggage.

The server device 100 is a device that manages and controls various devices in the facility including the vehicle V, and is disposed in the facility, for example. The server device 100 is implemented as a cloud server, and may be disposed outside the facility, for example. The server device 100 corresponds to an example of a "monitoring device" or a "control device".

The disaster information providing device 200 is a device that is disposed in a disaster information providing organization such as the Meteorological Agency, for example, and provides disaster information about a fire, an earthquake, and the like. The disaster information providing device 200 may be a device operated and managed by a private company that provides a disaster information providing service.

The vehicle V, the server device 100, and the disaster information providing device 200 are disposed to be able to communicate with each other via a network N such as the Internet or a mobile telephone line network. The vehicles V can also communicate with each other via vehicle-to-vehicle communication, for example.

In a case in which a disaster requiring evacuation occurs inside the facility or outside the facility, the vehicle V and the server device 100 detects the disaster based on a situation inside the facility acquired by itself and disaster information provided from the disaster information providing device 200.

Herein, in a case in which a disaster occurs, most of people present in the facility as well as the user riding on the manned vehicle V-m take evacuation action of moving to a final evacuation place that is determined in advance to be a designated evacuation place of the facility. The final evacuation place is a final place to which employees and customers are guided to evacuate by the facility side at the time when a disaster occurs. Examples of the final evacuation place include evacuation places determined in advance for each facility such as a place outside a building (outdoors) in a case of a fire or an earthquake, for example, and an upper floor (including a rooftop) in a case of a tidal wave, for example.

However, movement from the current position to the final evacuation place is difficult in some cases such that an emergency exit as an evacuation exit to the final evacuation place becomes unavailable due to the disaster. This is a problem that is often caused for evacuees including the user riding on the vehicle V on a floor equal to or higher than the second floor particularly in a case in which a building of the facility includes a plurality of floors.

To assist evacuation action in such a case in which a disaster occurs, in the vehicle control method according to the embodiment, the manned vehicle V-m is moved to a place appropriate for evacuation within a movable range.

The following exemplifies a specific situation at the time when a disaster occurs. In the example illustrated in FIG. 3, it is assumed that a fire occurs on the second floor, and an elevator e1 and an emergency exit e2 as evacuation exits to the final evacuation place on the first floor are close to an origin of the fire and are unavailable. The emergency exit e2 is an entrance to a route connected to the outside of the facility such as stairs, for example.

In the present embodiment, the "place appropriate for evacuation" is not the final evacuation place but a place where people can stand by for evacuation. For example, in a case of a fire, it is a place distant from the origin of the fire where a window (evacuation window) and the like connected to the outside is disposed. In a case of an earthquake, it is a place including a larger space and the like.

Evacuation exits at the time of moving between floors to evacuate include an escalator on which people can walk to going up and down even when the escalator is stopping in addition to an elevator and stairs (emergency exit). Furthermore, a slope on which people can travel while riding on the vehicle V to move between floors may be disposed.

The emergency exits at the time of a disaster also include an entrance to a route present in an entry prohibited region (staff-only region) that a customer cannot enter at a normal time. In a case of guiding the customer to the entrance in the entry prohibited region, a guide display disposed on a wall and the like is insufficient in some cases because the region is not for the customer, so that it is preferable to provide route guidance after the customer enters the entry prohibited region.

In a case of a situation such as the example of FIG. 3, in the vehicle control method according to the embodiment, the server device 100 acquires a situation inside the facility via sensor units in the facility as various kinds of sensors including a camera and the like, and calculates a large place (refer to a region R1 in the drawing) within a movable range from the current position of the manned vehicle V-m to be set as a destination based on the situation, the place distant from the origin of the fire and the safety of which is considered to be high (Step S1). The manned vehicle V-m moves to the destination by manual traveling or automatic traveling, and the region R1 becomes a temporary evacuation place.

In this way, by collecting manned vehicles V-m in one place, rescue activity can be smoothed. For example, in a case of FIG. 3, the server device 100 calculates an area in which the manned vehicles V-m can be collected and accommodated at least in a region distant from the origin of the fire present on the second floor, and extracts a space having such an area on the second floor as the region R1.

In the example illustrated in FIG. 4, it is assumed that a fire has occurred on the second floor, but the elevator e1 and the emergency exit e2 as the evacuation exits to the final evacuation place are available.

In a case of a situation such as the example of FIG. 4, in the vehicle control method according to the embodiment, the server device 100 acquires the situation inside the facility, and calculates a place close to the evacuation exit within the movable range from the current position of the manned vehicle V-m to be set as the destination based on the situation (Step S2). The manned vehicle V-m moves to the destination by manual traveling or automatic traveling.

For example, in a case of FIG. 4, the server device 100 sets, for a manned vehicle V-m1, a place close to the elevator e1 that is the closest evacuation exit within the movable range from the current position of the manned vehicle V-m1 as the destination. For a manned vehicle V-m2, the server device 100 sets a place close to the emergency exit e2 that is the closest evacuation exit within the movable range from the current position of the manned vehicle V-m2 as the destination. Due to this, by shortening a distance by which the user moves after getting off the vehicle V, it is possible to assist evacuation action while reducing a burden on the user.

At the time of a disaster, it is preferable to give priority to emergency routes while considering that the elevator e1 may be stopped due to a power failure and the like, for example. Considering a power failure and the like, for example, priority is represented as stairs>escalator>elevator in descending order. The priority can be changed depending on content of the disaster that has occurred, presence/absence of an emergency power supply, and the like. For example, in a case in which there is a low possibility that the elevator stops because an emergency power supply is disposed in the elevator of the facility, and the user riding on the vehicle V is a person having walking difficulty, the priority described above may be changed to cause the priority of the elevator to be the highest.

The example illustrated in FIG. 5 is basically in the same situation as the example in FIG. 4, but it is assumed that communication with the server device 100 has been lost. In a case of the situation as in the example of FIG. 5, with the vehicle control method according to the embodiment, the vehicle V is caused to travel following the surroundings based on recognition content recognized by the onboard device 10 via the onboard sensor unit (Step S3).

For example, in a case of FIG. 5, the onboard devices 10 of the manned vehicles V-m1 and m2 cause the manned vehicles V-m1 and m2 to travel following evacuees in an evacuation direction of the evacuees heading for the elevator e1.

The onboard device 10 of the manned vehicle V-m3 causes the manned vehicle V-m3 to travel following the evacuees in the evacuation direction of the evacuees heading for the emergency exit e2. Due to this, even in a case in which communication with the server device 100 has been lost, it is possible to assist evacuation action while reducing a burden on the user.

In a case of the example illustrated in FIG. 3, after collecting the evacuees in the region R1, a notification may be made for a saver. In a case of examples in FIG. 4 and FIG. 5, the vehicle V may be caused to stand by at a place where the user can use it after the user moves to another floor via the evacuation exit. In a case of the example of FIG. 5, the vehicle V may be caused to perform following traveling by using V2X communication and the like. Such various modifications will be described later with reference to FIG. 9 to FIG. 16.

The examples in FIG. 3 to FIG. 5 can be applied to a case in which a place where the vehicle V is present is on the same floor as the final evacuation place (for example, the final evacuation place is the outside of the building, and the place where the vehicle V is present is the first floor). For example, exemplified are a case in which an original building structure is a structure in which a person cannot get out from the building to the outside while riding on the vehicle V (a structure in which steps and the like are present on an entrance and exit, for example), a case in which a person can get out from the building to the outside while riding on the vehicle V in the original building structure but a door or a passage for getting out to the outside from the building is unavailable due to influence of the disaster, and the like. In this case, the evacuation exit is a doorway and the like for getting out to the outside of the building.

In this way, in the vehicle control method according to the embodiment, if the vehicle V on which a person is riding is difficult to move from the current position to the predetermined evacuation place in a case in which a disaster requiring evacuation occurs, the vehicle V is moved to a place appropriate for evacuation within the movable range.

Thus, with the vehicle control method according to the embodiment, the evacuees can be moved to a place appropriate for evacuation. The following describes a configuration example of the vehicle control system 1 according to the embodiment more specifically.

Figure 6:
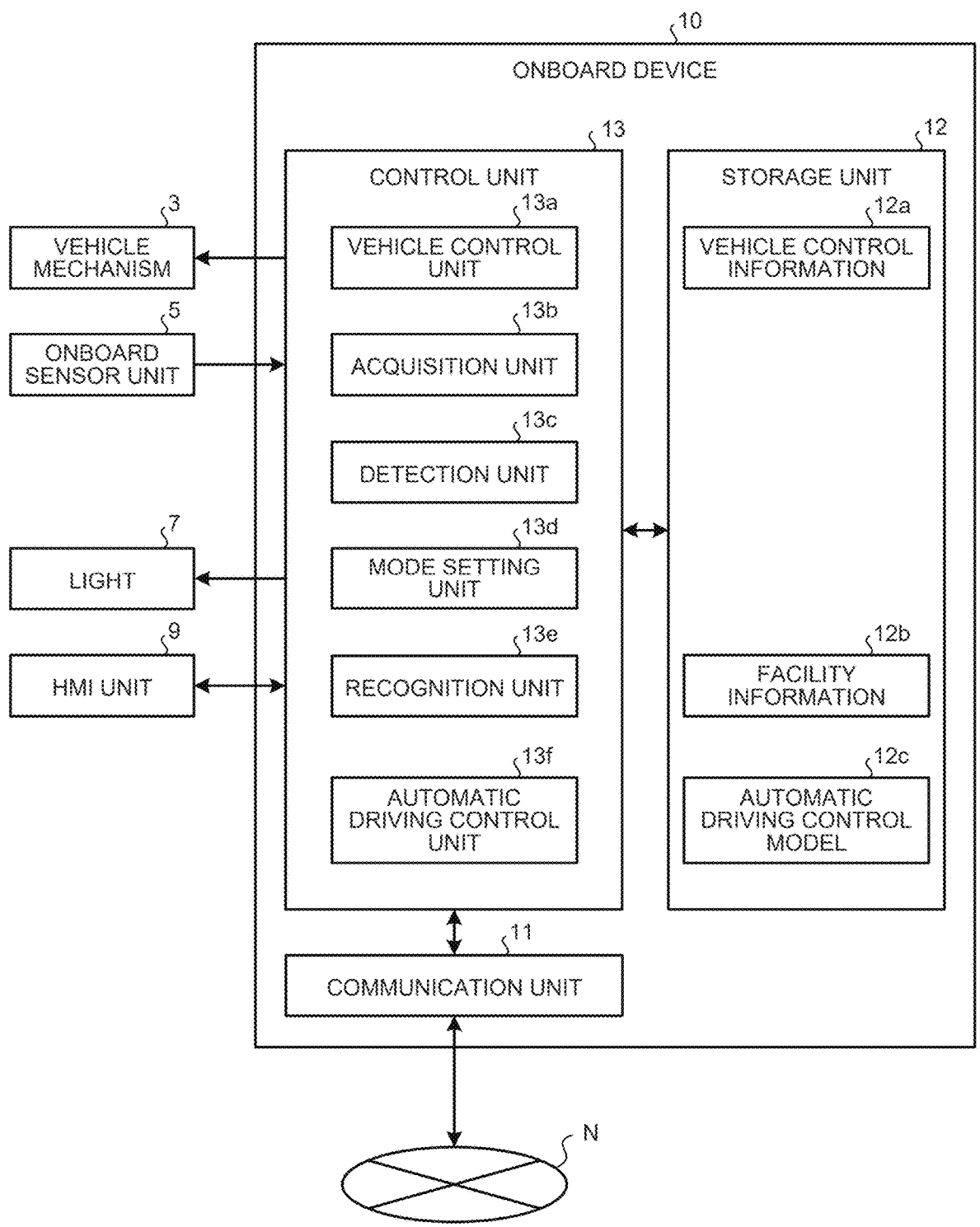
FIG. 6 is a block diagram illustrating a configuration example of an onboard device according to the embodiment.
Figure 7:
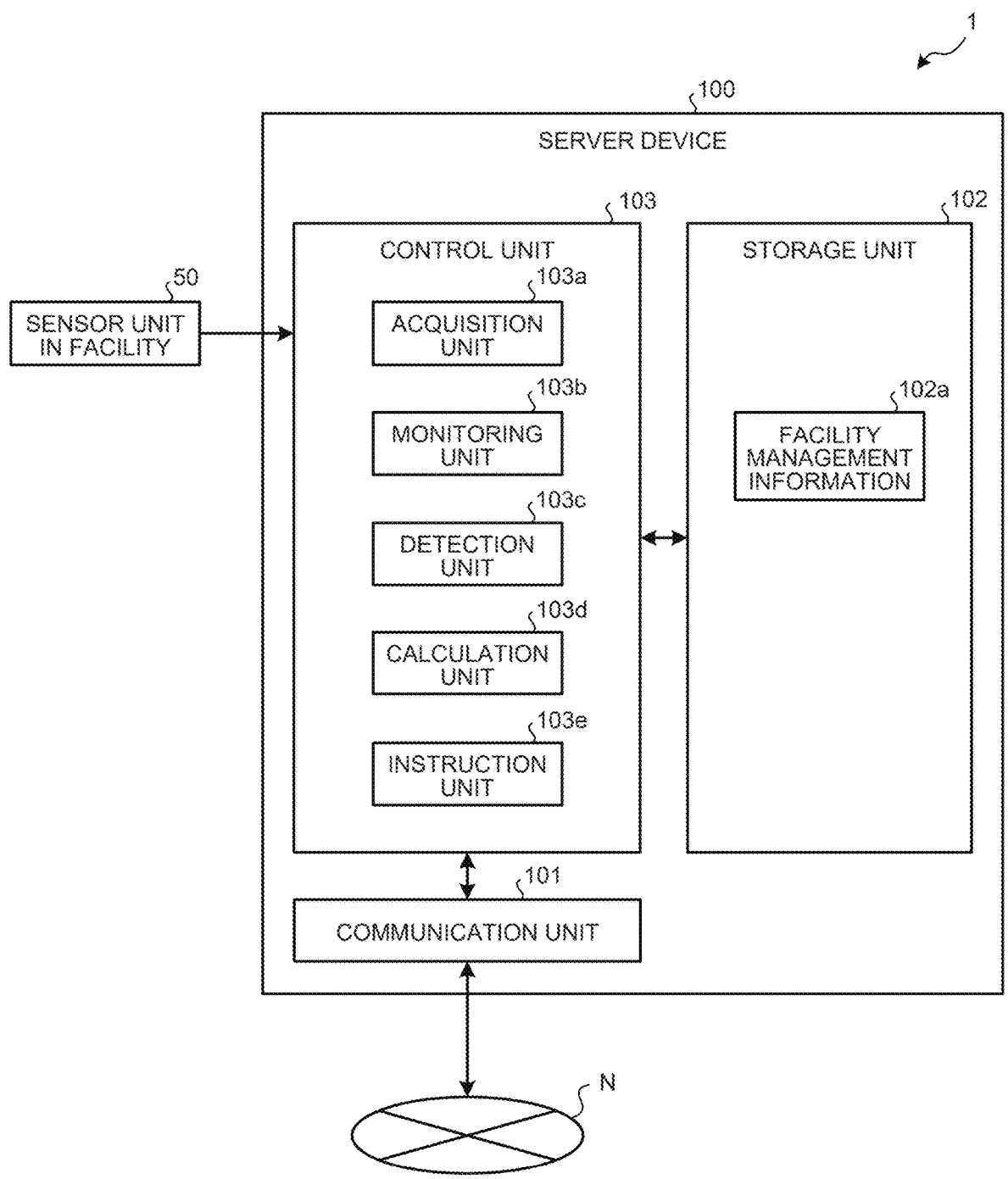
FIG. 7 is a block diagram illustrating a configuration example of a server device according to the embodiment.

FIG. 6 is a block diagram illustrating a configuration example of the onboard device 10 according to the embodiment. FIG. 7 is a block diagram illustrating a configuration example of the server device 100 according to the embodiment. FIG. 6 and FIG. 7 illustrate only constituent elements required for explaining characteristics of the present embodiment, and typical constituent elements are not illustrated therein.

In other words, the constituent elements illustrated in FIG. 6 and FIG. 7 are merely conceptual, and it is not required that they are physically configured as illustrated necessarily. For example, specific forms of distribution and integration of respective blocks are not limited to those illustrated in the drawings. All or part thereof may be functionally or physically distributed/integrated in arbitrary units depending on various loads or usage states.

In the description with reference to FIG. 6 and FIG. 7, description about the constituent element that has been already described may be simplified or omitted.

The onboard device 10 is connected to a vehicle mechanism 3, an onboard sensor unit 5, a light 7, and a Human Machine Interface (HMI) unit 9 via a Controller Area Network (CAN) and the like.

The vehicle mechanism 3 is various mechanisms that constitute a traveling system, a power system, and the like of the vehicle V. The onboard sensor unit 5 is a sensor group that is mounted on the vehicle V, and outputs various kinds of sensing data indicating situations inside and outside the vehicle V. The onboard sensor unit 5 includes, for example, a camera, a G sensor, a radar, a GPS sensor, a seating sensor, and the like.

The light 7 is a lamplight and the like mounted on the vehicle V such as a headlight and a taillight. The HMI unit 9 is various interface components for exchanging information between the user and the vehicle V, and includes software components displayed on a display unit in addition to hardware components such as an accelerator, a brake, a steering gear, the display unit, a speaker, and a microphone.

The onboard device 10 includes a communication unit 11, a storage unit 12, and a control unit 13. The communication unit 11 is implemented by a Network Interface Card (NIC) and the like, for example.

The communication unit 11 is connected to the network N described above in a wireless manner, and transmits/receives various kinds of information to/from the server device 100 and the disaster information providing device 200 via the network N. The communication unit 11 can also transmit/receive various kinds of information to/from the other vehicle V and various devices such as a roadside machine installed in the facility and a portable terminal device carried by a person via V2X communication. As a specific wireless communication scheme, Wi-Fi (registered trademark), Bluetooth (registered trademark), Ultra Wide Band (UWB), and the like can be used.

The storage unit 12 is, for example, implemented by a storage device such as a random access memory (RAN) and a flash memory, or a disk device such as a hard disk device and an optical disc device. In the example of FIG. 6, the storage unit 12 stores vehicle control information 12a, facility information 12b, and an automatic driving control model 12c.

The vehicle control information 12a is information about vehicle control for the vehicle V, and includes parameters and the like indicating various characteristics of the vehicle mechanism 3, for example. The facility information 12b is information about the facility, and includes map information and the like in the facility in which the vehicle V travels, for example.

The automatic driving control model 12c is a control model for causing the vehicle V to perform automatic driving, and is a Deep Neural Network (DNN) and the like that have performed learning to cause the vehicle V to perform automatic driving control in accordance with recognition content based on sensing data of the onboard sensor unit 5, for example. The automatic driving control model 12c may be stored by the server device 100.

The control unit 13 is a controller, and implemented when various computer programs (not illustrated) stored in the storage unit 12 are executed by using a RAM as a working area by a central processing unit (CPU), a micro processing unit (MPU), and the like. The control unit 13 can be, for example, implemented by an integrated circuit such as an application specific integrated circuit (ASIC) and a field programmable gate array (FPGA). The control unit 13 corresponds to an example of a "second controller".

The control unit 13 includes a vehicle control unit 13a, an acquisition unit 13b, a detection unit 13c, a mode setting unit 13d, a recognition unit 13e, and an automatic driving control unit 13f, and implements or executes a function or operation of information processing described below.

The vehicle control unit 13a controls the vehicle V based on a driving operation performed by the user via the HMI unit 9, an automatic driving instruction from the automatic driving control unit 13f (described later), an instruction from the server device 100, the vehicle control information 12a, and the like.

For example, in a case in which the vehicle V is in a manned mode at the time of a disaster (described later), the vehicle control unit 13a causes the vehicle V to move to a large place within the movable range from the current position that is calculated to be set as the destination by the server device 100 based on the situation in the facility.

For example, in a case in which the vehicle V is similarly in the manned mode at the time of a disaster, the vehicle control unit 13a causes the vehicle V to move to a place close to the evacuation exit within the movable range from the current position that is calculated to be set as the destination by the server device 100 based on the situation in the facility.

For example, in a case in which the vehicle V is similarly in the manned mode at the time of a disaster but communication with the server device 100 has been lost, the vehicle control unit 13a causes the vehicle V to travel following the surroundings based on recognition content obtained by the recognition unit 13e (described later).

The acquisition unit 13b acquires various kinds of sensing data from the onboard sensor unit 5. The acquisition unit 13b also acquires various kinds of information from the server device 100 and the disaster information providing device 200 via the communication unit 11.

The detection unit 13c detects occurrence of a disaster based on the various kinds of information acquired by the acquisition unit 13b. In a case of detecting occurrence of the disaster, the detection unit 13c detects whether the user is riding on the vehicle V. The detection unit 13c detects whether communication with the server device 100 can be performed.

In a case in which the detection unit 13c detects occurrence of the disaster, the mode setting unit 13d causes the vehicle V to shift from a normal mode to a disaster mode. At this point, in a case in which the user is riding on the vehicle V, the mode setting unit 13d causes the vehicle V to shift to the manned mode at the time of a disaster. In a case in which the user is not riding on the vehicle V, the vehicle V is shifted from the normal mode to an unmanned mode at the time of a disaster. In the normal mode, the vehicle V is caused to travel based on a user's operation at the time when the user is riding on the vehicle. Additionally, in the normal mode, at the time when the user is not riding on the vehicle, the vehicle V is caused to travel to a designated place by automatic driving based on an instruction from the server device 100, or caused to travel along a predetermined round route.

Figure 8:
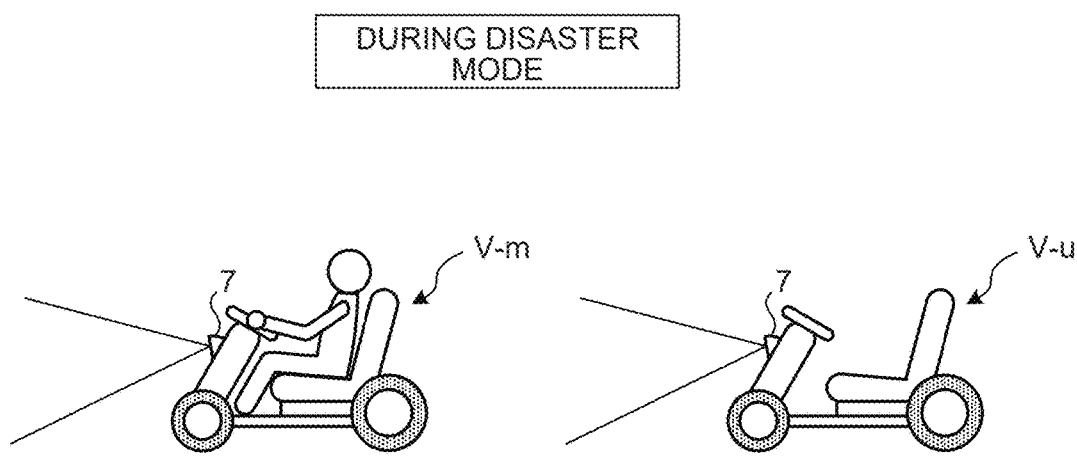
FIG. 8 is a diagram illustrating a state of a vehicle during a disaster mode.

FIG. 8 is a diagram illustrating a state of the vehicle during the disaster mode. As illustrated in FIG. 8, during the disaster mode, the mode setting unit 13d causes the light 7 to be automatically lit for both of the manned vehicle V-m and the unmanned vehicle V-u. Due to this, presence of the vehicle V can be clearly shown to the evacuees in the surroundings, visibility in the surroundings can be improved, and evacuation action of the evacuees can be assisted.

In a case in which the HMI unit 9 includes a speaker, the mode setting unit 13*d* may notify the surroundings of guidance information about evacuation as voice information via the speaker. In a case in which the HMI unit 9 includes a display unit, the mode setting unit 13*d* may notify the surroundings of guidance information about evacuation as display information via the display unit. The voice information and the display information may be combined with each other.

Return to the description of FIG. 6. The recognition unit 13*e* recognizes a situation around the vehicle V based on sensing data of the onboard sensor unit 5 and the like. The recognition unit 13*e* recognizes a situation of visibility in the surroundings. In a case in which the visibility is poor, the recognition unit 13*e* causes the light 7 described above to blink, and causes presence of the vehicle V to be clearly shown to the evacuees in the surroundings.

The automatic driving control unit 13*f* performs automatic driving control for the vehicle V based on a recognition result obtained by the recognition unit 13*e* and the automatic driving control model 12*c*, and causes the vehicle control unit 13*a* to cause the vehicle V to perform automatic traveling.

In a case in which the vehicle V is in the unmanned mode at the time of a disaster, the automatic driving control unit 13*f* causes the vehicle V to take refuge not to hinder passage of the evacuees in accordance with an instruction from the server device 100.

Subsequently, the following describes a configuration example of the server device 100. As illustrated in FIG. 7, the server device 100 is connected to a sensor unit 50 in the facility.

The sensor unit 50 in the facility is a sensor group that is installed in the facility, and outputs various kinds of sensing data indicating situations in the facility. The sensor unit 50 in the facility includes, for example, a camera, a human sensor, a temperature/humidity sensor, a G sensor, a vibration sensor, and the like.

The server device 100 includes a communication unit 101, a storage unit 102, and a control unit 103. The communication unit 101 is, for example, implemented by an NIC and the like similarly to the communication unit 11 described above.

The communication unit 101 is connected to the network N described above in a wired or wireless manner, and transmits/receives various kinds of information to/from the onboard device 10 and the disaster information providing device 200 via the network N. As a specific wireless communication scheme in a case of being connected in a wireless manner, Wi-Fi, Bluetooth, UWB, and the like can be used.

Similarly to the storage unit 12 described above, for example, the storage unit 102 is implemented by a storage device such as a RAM and a flash memory, or a disk device such as a hard disk device and an optical disc device. In the example of FIG. 8, the storage unit 102 stores facility management information 102*a*.

The facility management information 102*a* is various kinds of information about the facility managed by the server device 100. The facility management information 102*a* includes, for example, all pieces of map information in the facility, information about all pieces of disaster prevention equipment, a designated evacuation place at the time when a disaster occurs, monitor monitoring information in the facility, a current state of the vehicle V, and the like. The current state of the vehicle V includes a current position of the vehicle V, a usage state of the vehicle V, attribute information of a user who is using the vehicle V, and the like.

Similarly to the control unit 13 described above, the control unit 103 is a controller, and implemented when various computer programs (not illustrated) stored in the storage unit 102 are executed by using a RAM as a working area by a CPU, an MPU, and the like. Similarly to the control unit 13 described above, the control unit 103 can be implemented by an integrated circuit such as an ASIC, an FPGA, and the like, for example. The control unit 103 corresponds to an example of a "first controller".

The control unit 103 includes an acquisition unit 103*a*, a monitoring unit 103*b*, a detection unit 103*c*, a calculation unit 103*d*, and an instruction unit 103*e*, and implements or executes a function or operation of information processing described below.

The acquisition unit 103*a* acquires various kinds of sensing data from the sensor unit 50 in the facility. The acquisition unit 103*a* also acquires various kinds of information from the vehicle V and the disaster information providing device 200 via the communication unit 101.

The monitoring unit 103*b* monitors a situation in the facility in real time based on the sensing data acquired by the acquisition unit 103*a*.

The detection unit 103*c* detects occurrence of a disaster based on various kinds of information acquired by the acquisition unit 103*a*. The calculation unit 103*d* calculates, in a case in which the detection unit 103*c* detects occurrence of the disaster, a moving place and a moving route for each of the vehicles V based on the facility management information 102*a*.

For the manned vehicle V-m, the calculation unit 103*d* calculates an evacuation place appropriate for evacuation within the movable range from the current position of the manned vehicle V-m, and an evacuation route heading for the evacuation place.

For example, as a destination of the manned vehicle V-m, the calculation unit 103*d* calculates a large place within the movable range from the current position of the manned vehicle V-m based on a situation in the facility.

Similarly, as a destination of the manned vehicle V-m, for example, the calculation unit 103*d* calculates a place close to the evacuation exit within the movable range from the current position of the manned vehicle V-m based on a situation in the facility.

For the unmanned vehicle V-u, the calculation unit 103*d* calculates a refuge place appropriate for preventing the unmanned vehicle V-u from hindering passage of the evacuees, and a refuge route heading for the refuge place.

The instruction unit 103*e* instructs the vehicle V of the moving place and the moving route calculated by the calculation unit 103*d* via the communication unit 101. That is, the instruction unit 103*e* instructs the manned vehicle V-m of the evacuation place appropriate for evacuation within the movable range of the manned vehicle V-m and the evacuation route heading for the evacuation place. The instruction unit 103*e* instructs the unmanned vehicle V-u of the refuge place appropriate for preventing the unmanned vehicle V-u from hindering passage of the evacuees and the refuge route heading for the refuge place.

Next, the following describes various modifications of an operation during the disaster mode of the vehicle control system 1 with reference to FIG. 9 to FIG. 16. FIG. 9 to FIG. 16 are operation explanatory diagrams (part 1) to (part 8) during the disaster mode according to the modifications.

Figure 9:
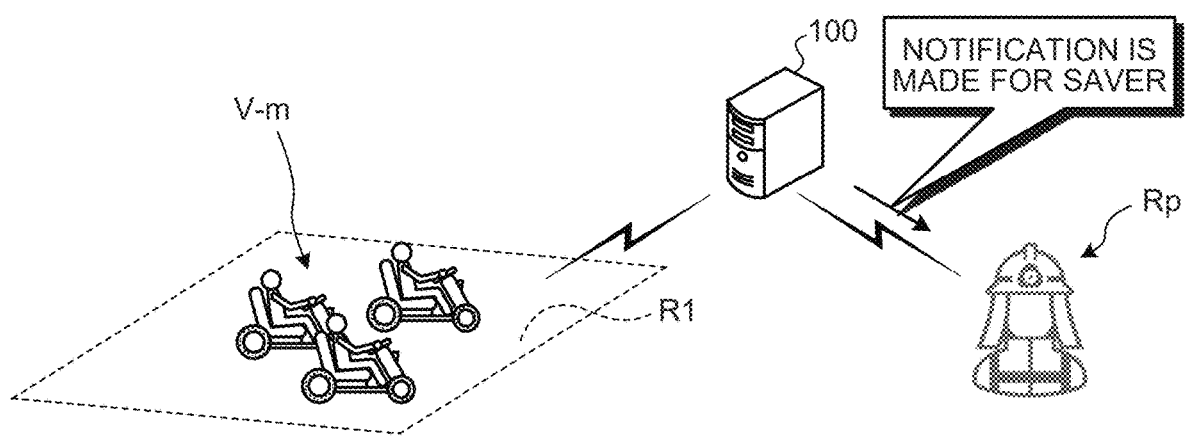
FIG. 9 is an operation explanatory diagram (part 1) during a disaster mode according to a modification.

First, as already illustrated in FIG. 3, after collecting the evacuees in the region R1 within the movable range from the current position of the manned vehicle V-m, the region R1 being a large place that is distant from the origin of the fire and has high safety, the server device 100 may notify a saver Rp that the evacuees are collected in the region R1 as illustrated in FIG. 9. The saver Rp is, for example, relevant organs and the like such as a fire station, an emergency hospital, and a police station. Due to this, rescue activity can be smoothed.

As already illustrated in FIG. 4, in a case of shortening a distance by which the user moves after getting off the vehicle V by causing the manned vehicle V-m to move to a place close to the evacuation exit within the movable range from the current position of the manned vehicle V-m, the vehicle V or an attribute of the user may be considered.

The attribute of the user herein is, for example, information indicating an attribute that indicates a degree to which the user can move by himself/herself. For example, an attribute of an able-bodied person is that he/she can move similarly to another user not using the vehicle V even after getting off the vehicle V. For example, an attribute of a disabled person is that he/she is difficult to move by himself/herself, and needs to be supported by a care worker and the like. Furthermore, an attribute such as an old person can be considered. It is preferable that the priority described above is appropriately changed while considering such an attribute of the user.

Figure 10:
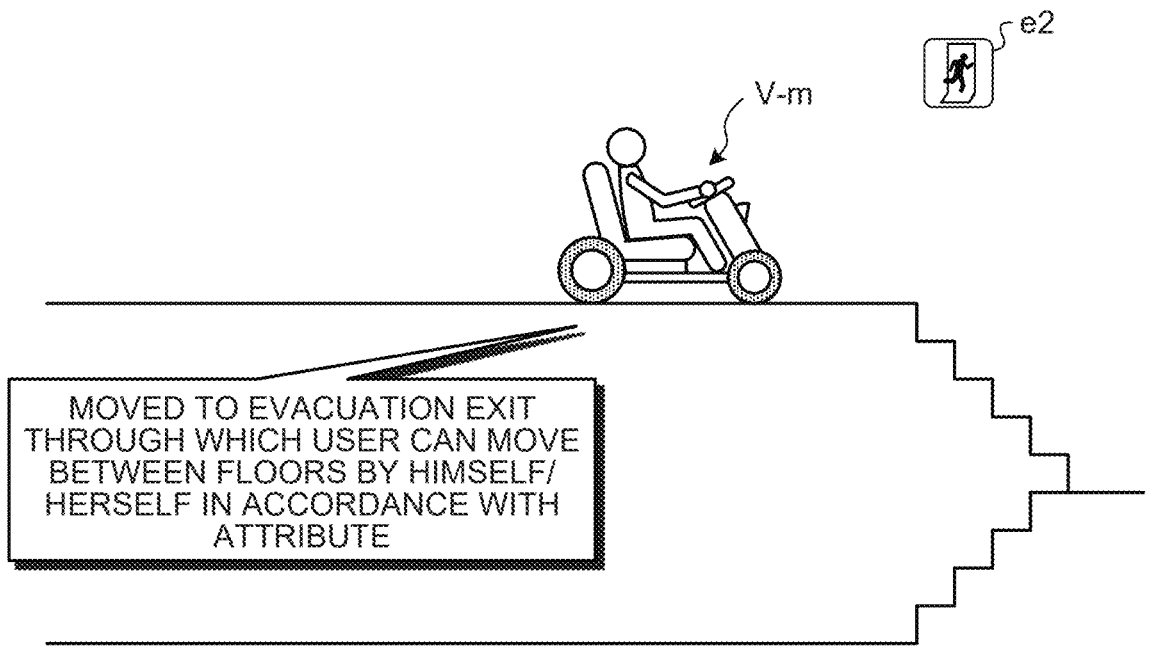
FIG. 10 is an operation explanatory diagram (part 2) during the disaster mode according to the modification.
Figure 11:
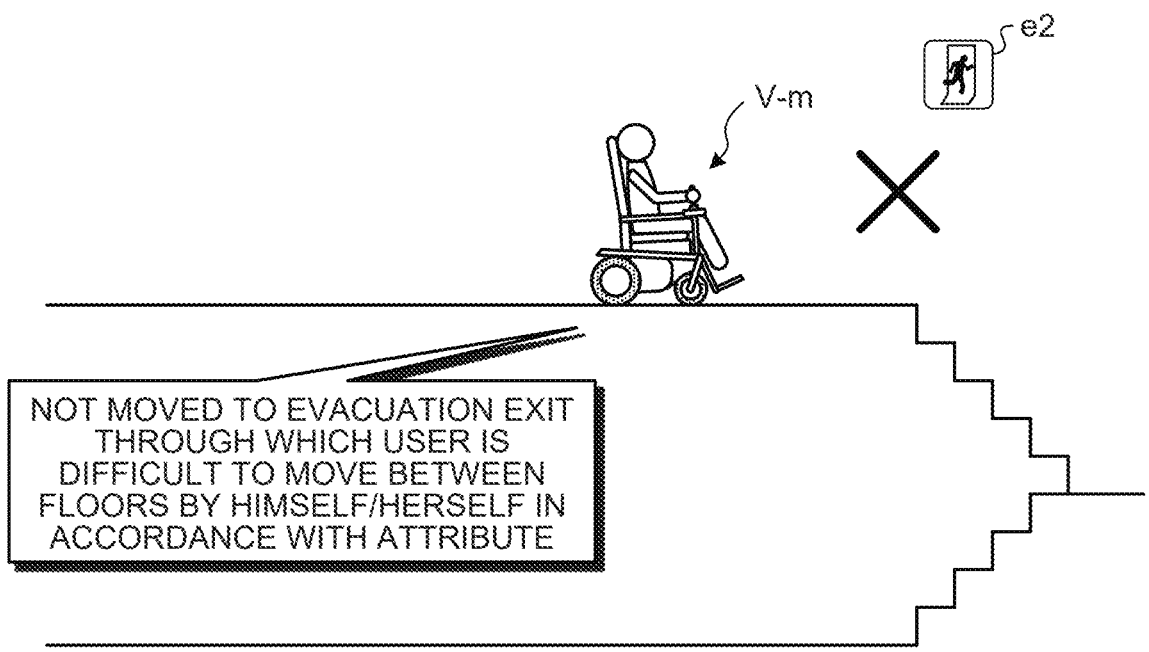
FIG. 11 is an operation explanatory diagram (part 3) during the disaster mode according to the modification.

As illustrated in FIG. 10 and FIG. 11, the emergency exit e2 is assumed to be an evacuation exit connected to emergency stairs. In such a case, the vehicle control system 1 determines whether the user can move between floors by himself/herself in accordance with content of the disaster, presence/absence of an emergency power supply, and the vehicle V or the attribute of the user riding thereon, and sets the destination.

For example, as illustrated in FIG. 10, in a case in which the vehicle V is not a wheelchair type and the attribute of the user is an able-bodied person, it can be considered that the user can move on the emergency stairs by himself/herself. Thus, in this case, the vehicle control system 1 causes the corresponding manned vehicle V-m to move to a place close to the emergency exit e2 as the destination. That is, as illustrated in FIG. 10, the vehicle control system 1 causes the manned vehicle V-m to move to the evacuation exit through which the user can move between floors by himself/herself in accordance with the vehicle V or the attribute of the user.

For example, as illustrated in FIG. 11, in a case in which the vehicle V is a wheelchair type, and a case in which the attribute of the user is a disabled person and the like, it can be considered that the user is difficult to move on the emergency stairs by himself/herself. Thus, in this case, the vehicle control system 1 does not cause the corresponding manned vehicle V-m to move to a place close to the emergency exit e2 as the destination. That is, as illustrated in FIG. 11, the vehicle control system 1 does not cause the manned vehicle V-m to move to the evacuation exit through which the user is difficult to move between floors by himself/herself in accordance with the vehicle V or the attribute of the user.

In a case of the example of FIG. 11, if there is the elevator e1 or an escalator that is available within the movable range, for example, the vehicle control system 1 selects it as the destination. Due to this, it is possible to assist smooth evacuation action in accordance with the vehicle V or the attribute of the user.

Figure 12:
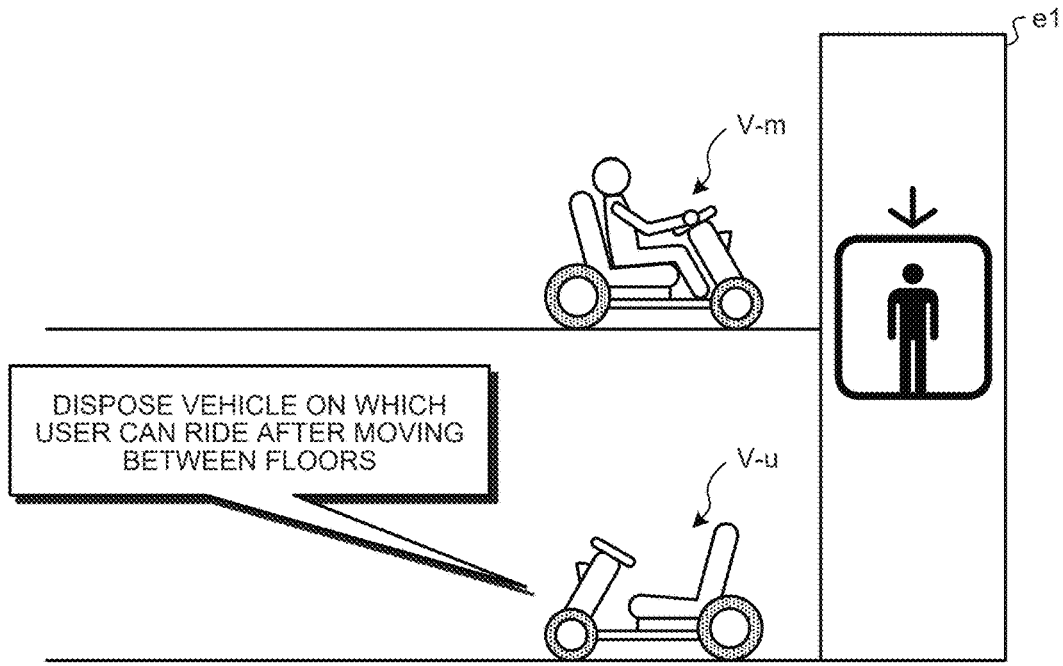
FIG. 12 is an operation explanatory diagram (part 4) during the disaster mode according to the modification.
Figure 13:
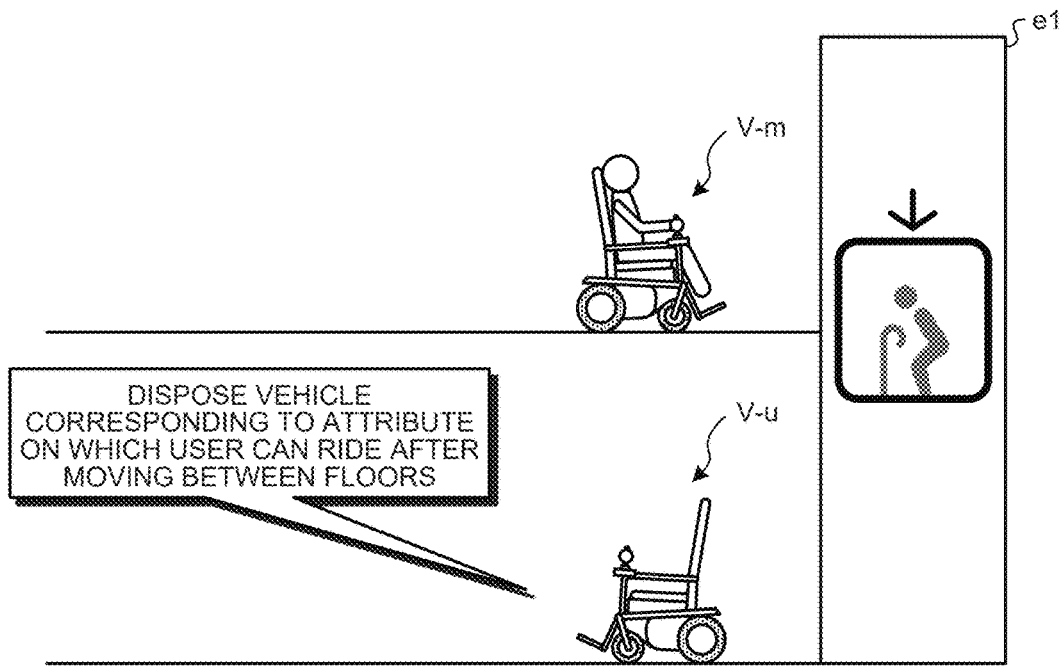
FIG. 13 is an operation explanatory diagram (part 5) during the disaster mode according to the modification.

As illustrated in FIG. 12, the vehicle control system 1 may dispose the unmanned vehicle V-u on which the user can ride after moving between floors. At this point, as illustrated in FIG. 13, the unmanned vehicle V-u corresponding to the attribute described above may be disposed. Due to this, it is possible to assist smooth evacuation action after moving between floors in accordance with the vehicle V or the attribute of the user. Movement destinations may include normal stairs, an escalator, and the like, which are not emergency stairs (an emergency exit). In a case of causing the vehicle V for transfer to stand by, if the movement destinations are concentrated at one place (emergency stairs and the like), the problem that a space to put the vehicle V cannot be secured may be caused. Thus, moving places may be distributed to a plurality of points including normal stairs, an escalator, and the like as described above.

Figure 14:
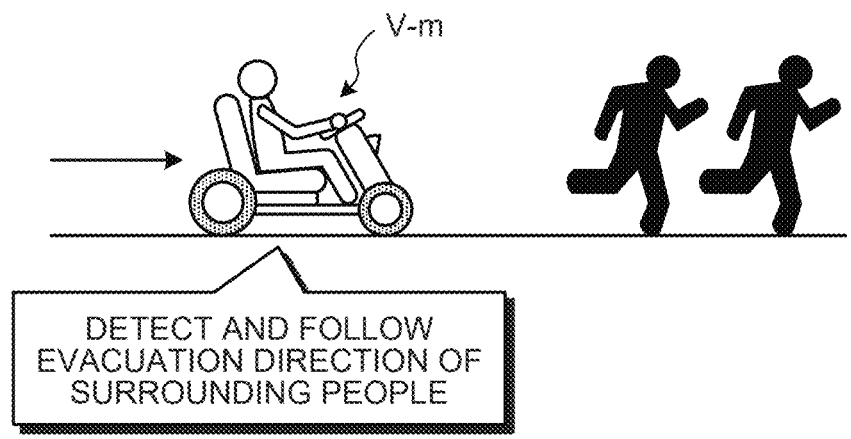
FIG. 14 is an operation explanatory diagram (part 6) during the disaster mode according to the modification.

As already illustrated in FIG. 5, in a case of causing the vehicle V to perform following traveling, for example, the manned vehicle V-m detects and follows the evacuation direction of surrounding people as illustrated in FIG. 14. At this point, the onboard device 10 of the manned vehicle V-m analyzes movement of people by optical flow and the like based on the sensing data of the onboard sensor unit 5, and detects the evacuation direction.

Figure 15:
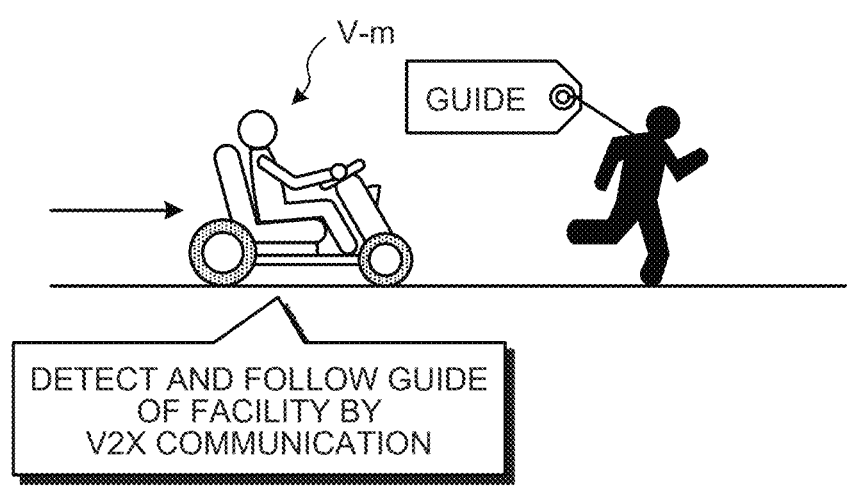
FIG. 15 is an operation explanatory diagram (part 7) during the disaster mode according to the modification.

As illustrated in FIG. 15, for example, the manned vehicle V-m may detect and follow a guide of the facility by V2X communication. In such a case, the guide previously has a portable terminal device, a beacon device, or a tag that can be identified as a guide using a short-range wireless communication technique, and can be followed when the tag, the beacon device, or the portable terminal is detected by the manned vehicle V-m at the time when a disaster occurs. A tag, a marker, and the like that can be identified as a guide may be detected by image analysis instead of V2X communication.

Figure 16:
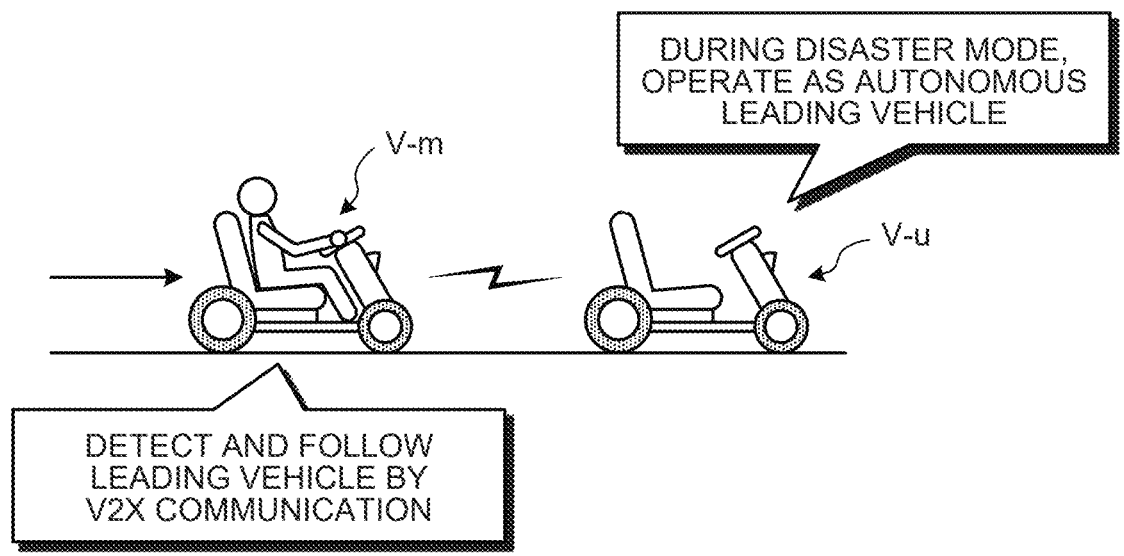
FIG. 16 is an operation explanatory diagram (part 8) during the disaster mode according to the modification.

As illustrated in FIG. 16, for example, the manned vehicle V-m may detect and follow a leading vehicle by V2X communication. In such a case, the vehicle control system 1 previously sets a specific vehicle V among the vehicles V to operate as an autonomous leading vehicle during the disaster mode in the unmanned state.

When the unmanned vehicle V-u as the leading vehicle approaches the manned vehicle V-m at the time when the disaster occurs, the manned vehicle V-m detects the approach by vehicle-to-vehicle communication, and performs following traveling at the end of a vehicle train led by the leading vehicle. Due to this, even in a case in which communication with the server device 100 has been lost, it is possible to assist evacuation action while reducing a burden on the user.

Figure 17:
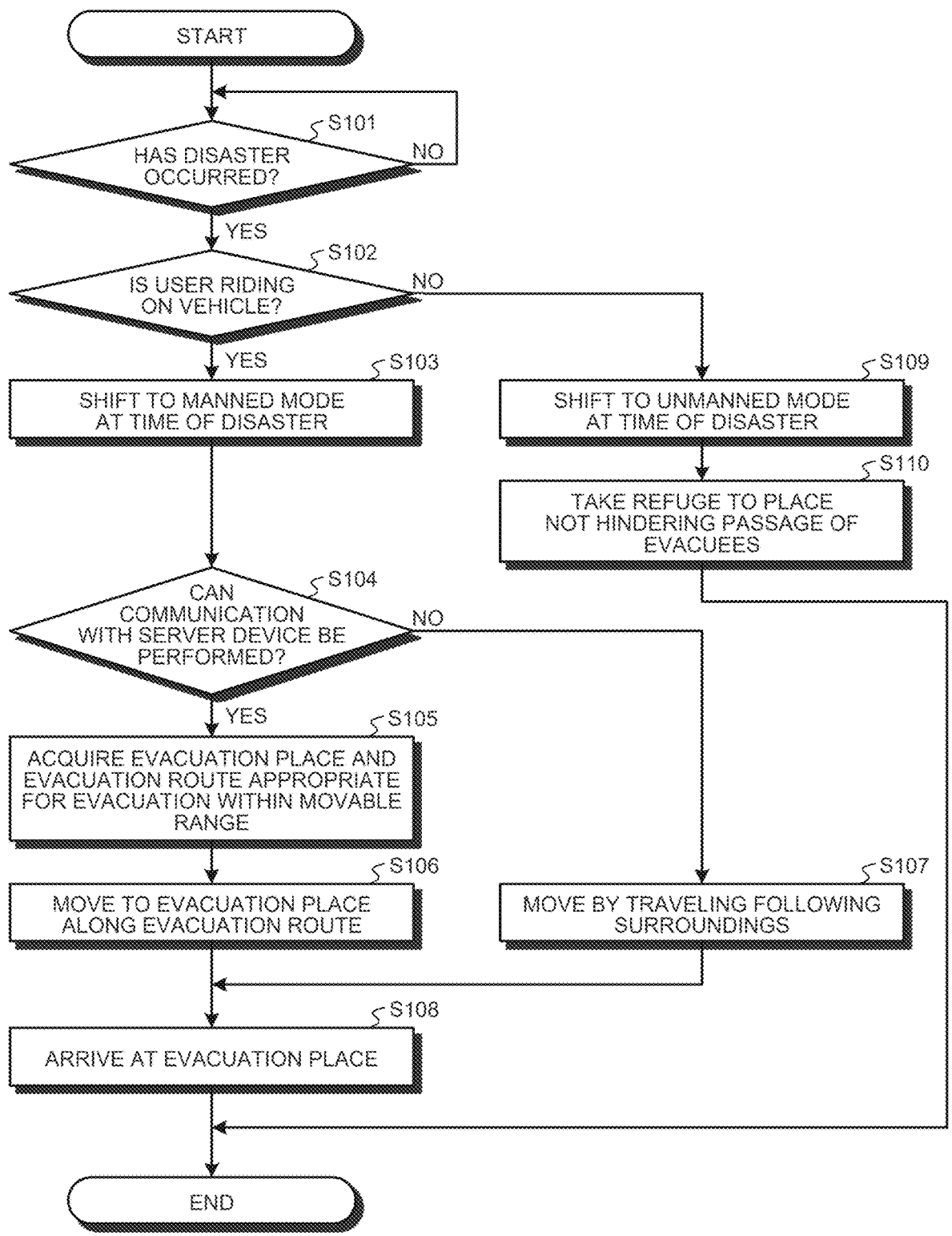
FIG. 17 is a flowchart illustrating a processing procedure performed by the onboard device according to the embodiment.

Next, the following describes a processing procedure performed by the onboard device 10 according to the embodiment. FIG. 17 is a flowchart illustrating the processing procedure performed by the onboard device 10 according to the embodiment.

As illustrated in FIG. 17, the detection unit 13c detects whether the disaster has occurred (Step S101). If the disaster has occurred (Yes at Step S101), the detection unit 13c detects whether the user is riding on the vehicle (Step S102). If the disaster has not occurred (No at Step S101), the normal mode is maintained, and Step S101 is repeated while control is performed in the normal mode.

If the user is riding on the vehicle (Yes at Step S102), that is, if the vehicle V is the manned vehicle V-m, the mode setting unit 13d causes the vehicle V to shift to the manned mode at the time of a disaster (Step S103). If the user is not riding on the vehicle (No at Step S102), transition is made to Step S109 (described later).

The detection unit 13c also detects whether communication with the server device 100 can be performed (Step S104). If communication with the server device 100 can be performed (Yes at Step S104), the acquisition unit 13b acquires, from the server device 100, an evacuation place appropriate for evacuation within the movable range and an evacuation route (Step S105).

The vehicle control unit 13a then causes the vehicle V to move to the evacuation place along the evacuation route (Step S106). At this point, the vehicle V may be caused to perform manual traveling or automatic traveling.

If communication with the server device 100 cannot be performed (No at Step S104), the automatic driving control unit 13f causes the vehicle control unit 13a to cause the vehicle V to move by traveling following the surroundings by automatic traveling based on recognition content of the recognition unit 13e (Step S107) The vehicle V or a person that should be followed may be notified to the user via the HMI unit 9, and may be followed by manual driving by the user.

When the vehicle arrives at the evacuation place (Step S108), the process is ended. On the other hand, if the user is not riding on the vehicle (No at Step S102), the mode setting unit 13d causes the vehicle V to shift to the unmanned mode at the time of a disaster (Step S109).

The automatic driving control unit 13f causes the vehicle control unit 13a to cause the unmanned vehicle V-u to take refuge to a place not hindering passage of the evacuees (for example, a place where the evacuees and vehicles V do not pass through at the time of evacuation such as a passage or a wall side of an open space) by automatic traveling (Step S110), and the process is ended. At Step S110, evacuation guidance may be given to the evacuees in the surroundings by lighting of a light, display, or voice. Part of the unmanned vehicles V-u may lead the evacuees and the manned vehicles V-m in the surroundings for evacuation (as a role of the leading vehicle in FIG. 16).

As described above, the onboard device 10 according to the embodiment is a vehicle control device mounted on the vehicle V that travels in a predetermined facility (corresponding to an example of an "area"), and includes the control unit 13. In a case in which a disaster requiring evacuation has occurred, if the vehicle V on which a person is riding is difficult to move from the current position to a predetermined evacuation place, the control unit 13 causes the vehicle V to move to a place appropriate for evacuation within the movable range.

Thus, with the onboard device 10 according to the embodiment, the evacuees can be moved to a place appropriate for evacuation.

The facility is a building. Thus, with the onboard device 10 according to the embodiment, the evacuees can be moved to a place appropriate for evacuation in the building.

The control unit 13 causes the vehicle V to move to a place having an area in which the vehicles V can be collected and accommodated within the movable range described above.

Thus, with the onboard device 10 according to the embodiment, the evacuees can be collected at the same place to enable rescue activity to be smoothly performed.

The control unit 13 causes the vehicle V to move to a place close to an available evacuation exit within the movable range described above.

Thus, with the onboard device 10 according to the embodiment, by shortening a distance by which the user moves after getting off the vehicle V, it is possible to assist evacuation action while reducing a burden on the user.

The facility is constituted of a plurality of floors, and the control unit 13 selects the evacuation exit through which the vehicle V is moved from among a plurality of types of evacuation exits through which the user can move between the floors in accordance with the vehicle V or the attribute of the user riding on the vehicle V.

Thus, with the onboard device 10 according to the embodiment, it is possible to assist smooth evacuation action in accordance with the vehicle V or the attribute of the user.

The control unit 13 causes the vehicle V on which nobody is riding to stand by so that the user who moves between the floors in the facility can ride thereon after moving between the floors.

Thus, with the onboard device 10 according to the embodiment, it is possible to assist smooth evacuation action after the user moves between the floors.

In a case in which communication with the server device 100 that calculates the place appropriate for evacuation described above has been lost, the control unit 13 causes the vehicle V to travel following the surroundings.

Thus, with the onboard device 10 according to the embodiment, even in a case in which communication with the server device 100 has been lost, it is possible to assist evacuation action while reducing a burden on the user.

In the embodiment described above, the unmanned vehicle V-u is assumed to be the vehicle V on which the user can ride, but the unmanned vehicle V-u may be a vehicle specialized in unmanned use. For example, the unmanned vehicle V-u may be an unmanned self-propelled cleaning robot, a self-propelled porter robot, and the like.

In the embodiment described above, mainly exemplified is a case in which the user cannot move to the final evacuation place while riding on the vehicle V. However, if the user can move to the final evacuation place while riding on the vehicle V, the user obviously moves to the final evacuation place as the evacuation place.

A movable region of the vehicle V lent out by the operation side of the facility is limited at a normal time as a non-disaster time. In this case, the movable region is the inside of the building, within a site of the facility, a region opened to customers within the building or within the site, and the like.

The final evacuation place and a temporary moving place in a case of being unable to move to the final evacuation place may be the inside of the movable region at the normal time described above, or may be the outside of the region.

The vehicle V may be a vehicle on which two or more people can ride. The vehicle V is not necessarily a type lent out to a customer, but may be a type such as a passenger bus on which a plurality of people can ride that rounds along a predetermined route.

A place including a plurality of floors is not limited to the inside of the building. For example, the place may be a slope such as a mountain slope on which a movable site (a site on which a building of a shop is disposed) is disposed in a stepped form. That is, it is a place such as terraced paddy fields in which each of the paddy fields has a large space.

The "evacuation exit" described above is a term widely encompassing an entrance of emergency stairs, a doorway for getting out to the outside of the building, an entrance of the elevator e1, various kinds of stairs for moving between floors, a front of an escalator or a slope, and the like.

According to one aspect of the embodiment, it is possible to cause evacuees to move to a place appropriate for evacuation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control method to be executed by a controller for controlling a vehicle that travels in an area including a plurality of floors, wherein
the controller is configured to:
set a destination to a first evacuation place;
in a case of detecting occurrence of a disaster and determining that a floor on which the vehicle exists is different from a floor on which the first evacuation place being a priority evacuation place exists, change the destination from the first evacuation place to a second evacuation place existing on a floor that is a same as the floor on which the vehicle exists; and
cause the vehicle to move to the second evacuation place.

2. The vehicle control method according to claim 1, wherein
the vehicle is a vehicle on which a person is riding.

3. The vehicle control method according to claim 1, wherein the area includes a building.

4. The vehicle control method according to claim 1, wherein
the controller is further configured to:
cause the vehicle to move to the second evacuation place having an area in which a plurality of the vehicles are able to be collected and accommodated within the movable range of the vehicle.

5. The vehicle control method according to claim 1, wherein
the controller is further configured to:
cause the vehicle to move to the second evacuation place that is close to an available evacuation exit within the movable range of the vehicle.

6. The vehicle control method according to claim 5, wherein
the controller is further configured to:
select the evacuation exit through which the vehicle is moved from among a plurality of types of the evacuation exits from each of which a user is able to move to another floor, in accordance with an attribute of the vehicle or the user that is riding on the vehicle.

7. The vehicle control method according to claim 6, wherein
the controller is further configured to:
cause the vehicle on which nobody is riding to stand by so that the user who moves between the floors in the area is able to ride on the vehicle after moving between the floors.

8. The vehicle control method according to claim 1, wherein
the controller is further configured to:
in a case in which determining that communication with an external device that calculates the second evacuation place has been lost, cause the vehicle to travel following the surroundings.

9. A control device capable of acquiring a situation of an area including a plurality of floors in which a vehicle is traveling, the device comprising:
a controller configured to:
set a destination to a first evacuation place;
in a case of detecting occurrence of a disaster and determining that a floor on which the vehicle exists is different from a floor on which the first evacuation place being a priority evacuation place exists, transmit information changing the destination from the first evacuation place to a second evacuation place existing on a floor that is a same as the floor on which the vehicle exists, as an evacuation destination; and
cause the vehicle to move to the second evacuation place.

10. A vehicle control system comprising:
a vehicle control device mounted on a vehicle that travels in an area;
and a monitoring device that monitors a situation of the area, wherein
the monitoring device includes a first controller configured to:
set a destination to a first evacuation place;
acquire information indicating a floor on which the vehicle exists; and
in a case of detecting occurrence of a disaster and determining that the floor in the acquired information is different from a floor on which the first evacuation place being a priority evacuation place exists, transmit information changing the destination from the first evacuation place to a second evacuation place existing on a floor that is a same as the floor on which the vehicle exists, as an evacuation destination, and
the vehicle control device includes a second controller configured to:
set the destination to the second evacuation place received from the monitoring device to move the vehicle to the second evacuation place.

11. The vehicle control method according to claim 1, wherein
the controller is configured to determine whether a user can move between floors by themself, and to select the second evacuation place based on whether the user can move between floors by themself.

12. The vehicle control method according to claim 11, wherein
the controller selects stairs as the second evacuation place when the controller determines that the user can move between floors by themself and the controller selects an elevator or an escalator as the second evacuation place when the controller determines that the user cannot move between floors by themself.

* * * * *